(12) United States Patent
Cobb et al.

(10) Patent No.: US 8,285,060 B2
(45) Date of Patent: Oct. 9, 2012

(54) DETECTING ANOMALOUS TRAJECTORIES IN A VIDEO SURVEILLANCE SYSTEM

(75) Inventors: Wesley Kenneth Cobb, The Woodlands, TX (US); Ming-Jung Seow, Houston, TX (US); Gang Xu, Katy, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 531 days.

(21) Appl. No.: 12/551,395

(22) Filed: Aug. 31, 2009

(65) Prior Publication Data

US 2011/0052000 A1   Mar. 3, 2011

(51) Int. Cl.
*G06K 9/00* (2006.01)
*G03B 19/18* (2006.01)

(52) U.S. Cl. .......................... 382/225; 382/103; 352/52

(58) Field of Classification Search .................. 382/100, 382/103, 106–107, 155, 162, 168, 173, 181, 382/193, 199, 209, 218, 219, 224, 232, 254, 382/274, 276, 282, 286–294, 305, 312, 225; 340/573.1, 948; 707/791; 352/52, 225
See application file for complete search history.

(56) References Cited

U.S. PATENT DOCUMENTS

| | | | |
|---|---|---|---|
| 4,679,077 A | 7/1987 | Yuasa et al. | |
| 5,113,507 A | 5/1992 | Jaeckel | |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 * | 12/2003 | Gordon et al. | 382/173 |
| 6,674,877 B1 * | 1/2004 | Jojic et al. | 382/103 |
| 6,678,413 B1 * | 1/2004 | Liang et al. | 382/181 |
| 6,856,249 B2 * | 2/2005 | Strubbe et al. | 340/573.1 |
| 6,940,998 B2 * | 9/2005 | Garoutte | 382/103 |
| 7,076,102 B2 * | 7/2006 | Lin et al. | 382/218 |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,606,425 B2 * | 10/2009 | Bazakos et al. | 382/224 |
| 7,825,954 B2 | 11/2010 | Zhang et al. | |

(Continued)

FOREIGN PATENT DOCUMENTS

WO    2009049314 A2    4/2009

OTHER PUBLICATIONS

International Search Report and Written Opinion of Patent Cooperation Treaty Application Serial No. PCT/US2010/045229 dated May 25, 2011.

(Continued)

*Primary Examiner* — Seyed Azarian
(74) *Attorney, Agent, or Firm* — Patterson & Sheridan LLP

(57) ABSTRACT

Techniques are disclosed for determining anomalous trajectories of objects tracked over a sequence of video frames. In one embodiment, a symbol trajectory may be derived from observing an object moving through a scene. The symbol trajectory represents semantic concepts extracted from the trajectory of the object. Whether the symbol trajectory is anomalous may be determined, based on previously observed symbol trajectories. A user may be alerted upon determining that the symbol trajectory is anomalous.

21 Claims, 8 Drawing Sheets

U.S. PATENT DOCUMENTS

| | | | |
|---|---|---|---|
| 7,868,912 | B2 | 1/2011 | Venetianer et al. |
| 7,882,135 | B2 * | 2/2011 | Brunner et al. ............... 707/791 |
| 2003/0107650 | A1 | 6/2003 | Colmenarez et al. |
| 2004/0151342 | A1 | 8/2004 | Venetianer et al. |
| 2005/0001759 | A1 | 1/2005 | Khosla |
| 2005/0104959 | A1 | 5/2005 | Han et al. |
| 2005/0105765 | A1 | 5/2005 | Han et al. |
| 2005/0240629 | A1 | 10/2005 | Gu et al. |
| 2006/0018516 | A1 | 1/2006 | Masoud et al. |
| 2006/0165386 | A1 | 7/2006 | Garoutte |
| 2006/0182339 | A1 | 8/2006 | Connell |
| 2006/0190419 | A1 | 8/2006 | Bunn et al. |
| 2006/0222206 | A1 | 10/2006 | Garoutte |
| 2008/0002856 | A1 | 1/2008 | Ma et al. |
| 2008/0181453 | A1 | 7/2008 | Xu et al. |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0252723 | A1 | 10/2008 | Park |
| 2009/0022364 | A1 | 1/2009 | Swaminathan et al. |
| 2009/0067716 | A1 | 3/2009 | Brown et al. |
| 2009/0210367 | A1 | 8/2009 | Armstrong et al. |
| 2009/0297023 | A1 | 12/2009 | Lipton et al. |
| 2009/0324107 | A1 | 12/2009 | Walch |
| 2010/0063949 | A1 | 3/2010 | Eaton et al. |

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

\* cited by examiner

P- ——— POSITION, HEIGHT, WIDTH
V- ······· POSITION, VELOCITY
A- - - - - POSITION, ACCELERATION

——— POSITION, HEIGHT, WIDTH
·········· POSITION, VELOCITY
— — — POSITION, ACCELERATION

US 8,285,060 B2

DETECTING ANOMALOUS TRAJECTORIES IN A VIDEO SURVEILLANCE SYSTEM

BACKGROUND OF THE INVENTION

1. Field of the Invention

Embodiments of the invention provide techniques for computationally analyzing a sequence of video frames. More specifically, embodiments of the invention relate to techniques for detecting anomalous trajectories of objects detected and tracked in the sequence of video frames.

2. Description of the Related Art

Some currently available video surveillance systems provide simple object recognition capabilities. For example, a video surveillance system may be configured to classify a group of pixels (referred to as a "blob") in a given frame as being a particular type of object (e.g., a person or vehicle). Once identified, a "blob" may be tracked frame-to-frame in order to follow the "blob" moving through the scene over time, e.g., a person walking across the field of vision of a video surveillance camera. Further, such systems may be configured to determine when an object has engaged in certain predefined behaviors.

However, such surveillance systems typically require that the objects and/or behaviors which may be recognized by the system to be defined in advance. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" (acceptable) or "abnormal" (anomalous) behavior needs to be defined in advance, and separate software products need to be developed to recognize additional objects or behaviors. This results in surveillance systems with recognition capabilities that are labor intensive and prohibitively costly to maintain or adapt for different specialized applications. Accordingly, currently available video surveillance systems are typically unable to recognize new patterns of behavior that may emerge in a given scene or recognize changes in existing patterns. More generally, such systems are often unable to identify objects, events, behaviors, or patterns as being "normal" or "abnormal" by observing what happens in the scene over time; instead, such systems rely on static patterns defined in advance.

SUMMARY OF THE INVENTION

One embodiment of the invention includes a computer-implemented method. The method may generally include passing each of a plurality of kinematic data vectors derived from analyzing a foreground object detected in the sequence of video frames to a plurality of adaptive resonance theory (ART) networks, each modeling a subset of kinematic data parsed from the kinematic data vectors; identifying, in each ART network, a cluster to which each respective subset of kinematic data parsed from the plurality of kinematic data vectors is mapped; generating a primitive trajectory based on the clusters identified in each of the ART networks; and generating a symbol trajectory from the primitive trajectory.

Another embodiment of the invention includes a computer-readable storage medium containing a program which, when executed by a computer processor, performs an operation. The operation may generally include passing each of a plurality of kinematic data vectors derived from analyzing a foreground object detected in the sequence of video frames to a plurality of adaptive resonance theory (ART) networks, each modeling a subset of kinematic data parsed from the kinematic data vectors; identifying, in each ART network, a cluster to which each respective subset of kinematic data parsed from the plurality of kinematic data vectors is mapped; generating a primitive trajectory based on the clusters identified in each of the ART networks; and generating a symbol trajectory from the primitive trajectory.

Still another embodiment includes a system having one or more computer processors and a memory containing a program, which, when executed by the one or more computer processors is configured to perform an operation. The operation may generally include passing each of a plurality of kinematic data vectors derived from analyzing a foreground object detected in the sequence of video frames to a plurality of adaptive resonance theory (ART) networks, each modeling a subset of kinematic data parsed from the kinematic data vectors; identifying, in each ART network, a cluster to which each respective subset of kinematic data parsed from the plurality of kinematic data vectors is mapped; generating a primitive trajectory based on the clusters identified in each of the ART networks; and generating a symbol trajectory from the primitive trajectory.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
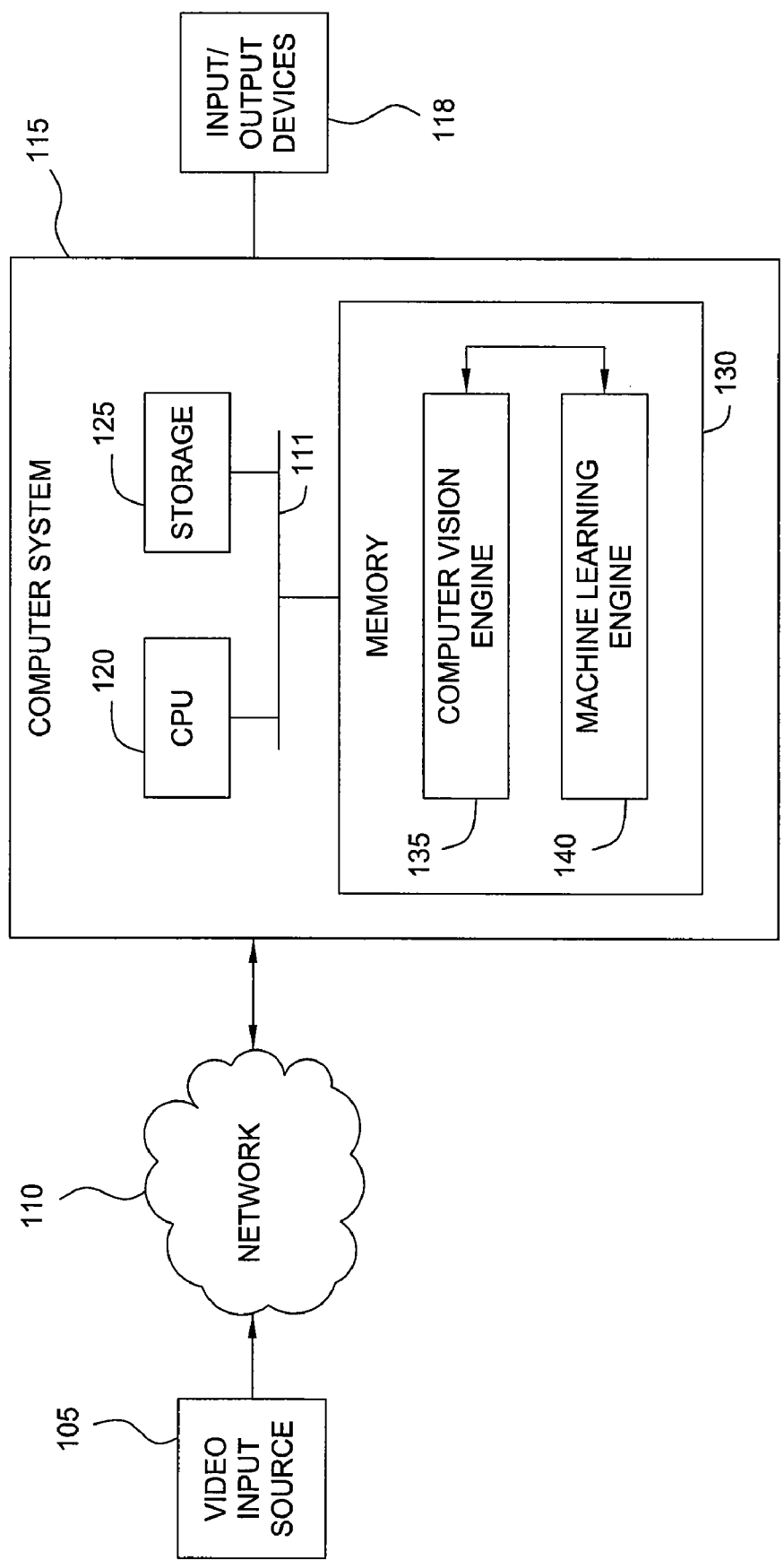
FIG. 1 illustrates components of a video analysis and behavior-recognition system, according to one embodiment of the invention.

Embodiments of the invention provide a behavior-recognition system. The behavior-recognition system may be configured to identify, learn, and recognize patterns of behavior by observing and evaluating events depicted by a sequence of video frames. In a particular embodiment, the behavior-recognition system may include both a computer vision engine and a machine learning engine. The computer vision engine may be configured to evaluate a stream of video frames. Typically, each frame of video may be characterized using multiple color (or grayscale) channels (e.g., a radiance value between 0-255 and a set of red, green, and blue (RGB) color channels values, each between 0-255). Further, the computer vision engine may generate a background image by observing the scene over a number of video frames. For example, consider a video camera trained on a stretch of a highway. In such a case, the background would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine may compare the pixel values for a given frame with the background image and identify objects as they appear and move about the scene. Typically, when a region of the scene (referred to as a "blob" or "patch") is observed with appearance values that differ substantially from the background image, that region is identified as depicting a foreground object. Once identified, the object may be evaluated by a classifier configured to determine what is depicted by the foreground object (e.g., a vehicle or a person). Further, the computer vision engine may identify features (e.g., height/width in pixels, average color values, shape, area, and the like) used to track the object from frame-to-frame. Further still, the computer vision engine may derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing a collection of kinematic information related to each foreground object detected in the video frames. The kinematic data vectors describe a foreground object using numerical data derived form analyzing the object from frame to frame. Each context event may provide kinematic data related to a foreground object observed by the computer vision engine in the sequence of video frames.

Data output from the computer vision engine may be supplied to the machine learning engine. In one embodiment, the machine learning engine may evaluate the context events to generate "primitive events" describing object behavior. Each primitive event may provide semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," vehicle turns," "vehicle slowing," and "vehicle stops" (once the kinematic information about the car indicated a speed of 0). As events occur, and re-occur, the machine learning engine may create, encode, store, retrieve, and reinforce patterns representing the events observed to have occurred, e.g., long-term memories representing a higher-level abstraction of a car parking in the scene—generated from the primitive events underlying multiple observations of different cars entering and parking. Further still, patterns representing an anomalous event (relative to prior observation) or events identified as an event of interest may result in alerts passed to users of the behavioral recognition system.

In one embodiment, the machine learning engine may include a mapper component configured to parse data coming from the context event stream and the primitive event stream and to supply portions of these streams as input to multiple neural networks (e.g., Adaptive Resonance Theory networks). As is known, Adaptive Resonance Theory (ART) describes a class of neural network models which use supervised and unsupervised learning methods. Each individual ART network generates clusters from the set of inputs data specified for that ART network. Each cluster represents an observed statistical distribution of a particular thing or event being modeled by that ART network. Further, the mapper component may be configured to detect unusual events occurring in the scene depicted by the video frames. For example, the mapper component may monitor the clusters that emerge from a given one of the ART networks, and in some cases, when a set of inputs results in a new cluster, generate an alert representing the occurrence of an unusual or anomalous event. In one embodiment, the ART network may be configured to provide dynamic clustering. That is, a cluster in the modified ART network described herein may change in size as each set of input data is mapped to that cluster. As described in greater detail below, a cluster may initially be defined as a relatively small size (e.g., an area corresponding to a radius of 5-10 pixels in the scene being modeled by the ART network). However, as inputs are mapped to that cluster, the size of the cluster may vary over time. Further, the clusters may decay over time and thus be removed. For example, if a cluster does not receive a set of input data (reinforcing the importance of that cluster) for a specified period of time, such a cluster may be removed from an ART network.

For example, the ART network may receive a vector as input and either update an existing cluster or create a new cluster, as determined using a choice test and a vigilance test for the ART network. The choice test provides a ranking of the existing clusters, relative to the vector input data. Once ranked, the vigilance test evaluates the existing clusters to determine whether to map the input to a given cluster. If no cluster is found to update using the data supplied to the input layer, evaluated sequentially using the ranked clusters, then a new cluster is created.

In one embodiment, the machine learning engine may also include a semantic labeler. As the ART network maps each set of input data to a cluster, the mapper component may send a label for the cluster to the semantic labeler. The machine learning engine may assign a distinct label to each cluster that emerges in a given ART network. The semantic labeler may generate a primitive trajectory from the cluster labels received for a foreground object as the foreground object moves through a scene. For example, an ART network may map kinematic data (e.g., position, height, and width) of the foreground object to clusters labeled P1, P2, and P3. In response, the semantic labeler may generate a primitive trajectory of {P1, P2, P3}. In one embodiment, a primitive trajectory is a sequence of cluster labels based on kinematic data mapped into one or more ART networks. Thus, the semantic labeler takes the numerical data describing a foreground object and transforms it into a symbolic representation; namely, a sequence of ART network labels—each modeling a different dimension of the object Further, the semantic labeler may generate a higher-order, "symbol trajectory" from multiple primitive trajectories. Thus, the semantic labeler transforms the numeric data derived from pixel color values and generates a symbolic representation in the primitive and symbol trajectories. In one embodiment, each primitive trajectory may emerge from a different ART network,. Each ART network may model a distinct set of kinematic (numerical) data for an object. For example, a first ART network may model position, height, and width of foreground objects. A second ART network may model position and velocity of the foreground objects. Suppose that the first ART network maps kinematic data of a foreground object to clusters P1, P2, and P3. Suppose that the second ART network maps kinematic data (for example, position and velocity) of the foreground object to clusters V1, V2, and V3. From the two primitive trajectories (i.e., {P1, P2, P3} and {V1, V2, V3}), the semantic labeler may generate a symbol trajectory of {X, Y, Z}. In this specific example, X represents the clusters P1 and V1; Y represents the clusters P2 and V2; and Z represents the clusters P3 and V3. That is, by combining primitive trajectories into a symbol trajectory, the semantic labeler defines higher-order observations that may be learned (and recognized) by the machine learning engine.

In one embodiment, the machine learning engine may also include an analyzer. The semantic labeler may send a symbol trajectory to the analyzer. The symbol trajectory may be derived from observing a foreground object moving through the scene. The symbol trajectory represents semantic concepts extracted from the trajectory. Further, the analyzer may determine whether the symbol trajectory is anomalous (relative to prior observation). For example, the analyzer may compute a likelihood of observing the symbol trajectory (based on symbol trajectories previously observed in the scene). Further still, anomalous behavior of a foreground object (i.e., behavior that produces a symbol trajectory determined to be anomalous) may result in an alert passed to users of the behavioral recognition system. Consequently, the machine learning engine performs unsupervised learning to automatically determine whether a given trajectory is anomalous. This unsupervised learning and trajectory discovery are adaptive because the knowledge about existing trajectories is dynamically updated as new trajectories are observed and are classified by the machine learning engine. That is, the machine learning engine is not limited to specific pre-defined trajectory types.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

The computer vision engine 135 may be configured to analyze this raw information to identify active objects in the video stream, classify the objects, derive a variety of metadata regarding the actions and interactions of such objects, and supply this information to a machine learning engine 140. In turn, the machine learning engine 140 may be configured to evaluate, observe, learn, and remember details regarding events (and types of events) that transpire within the scene over time.

In one embodiment, the machine learning engine 140 receives the video frames and the data generated by the computer vision engine 135. The machine learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
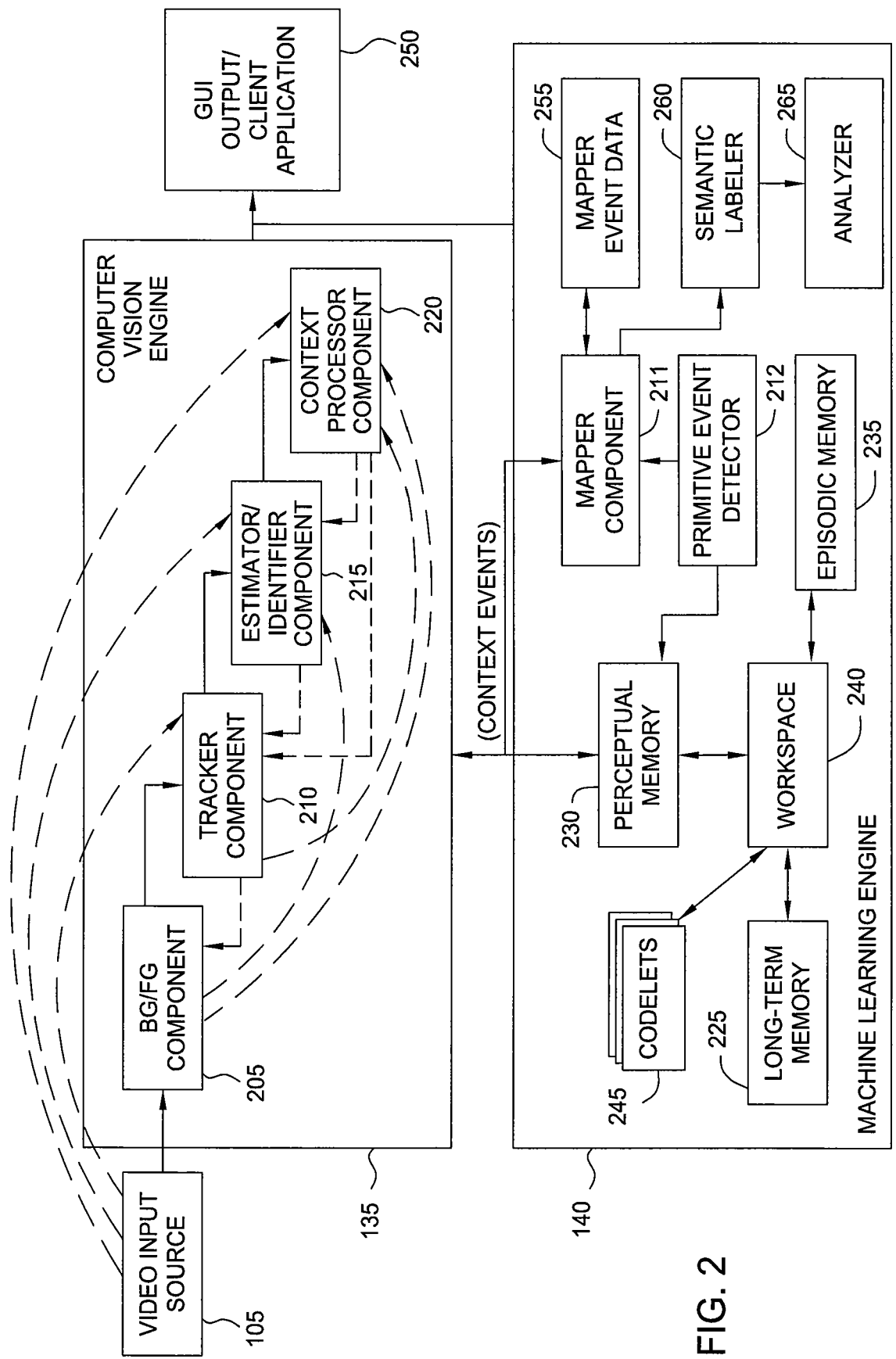
FIG. 2 illustrates components of a computer vision engine and of a machine learning engine, according to one embodiment of the present invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed) from a video surveillance system.

In one embodiment, the BG/FG component 205 may be configured to separate each frame of video provided by the video input source 105 into a stationary or static part (the scene background) and a collection of volatile parts (the scene foreground). The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. In such a case, mature clusters in the ART network modeling a given pixel are presumed to model a background state and pixel color values in an input frame mapping to a mature cluster are presumed to depict scene background in that frame, where pixels mapping to an immature cluster (or to a new cluster) are presumed to depict an element of a foreground object (or an emergent background state). Of course, other approaches to distinguish between scene foreground and background may be used.

Additionally, the BG/FG component 205 may be configured to generate a mask used to identify which pixels of the scene are classified as depicting foreground and, conversely, which pixels are classified as depicting scene background. The BG/FG component 205 then identifies (contiguous) regions of the scene that contain a portion of scene foreground (referred to as a foreground "blob" or "patch") and supplies this information to subsequent stages of the pipeline.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and classify each tracked object as being one of a known category of objects. In one embodiment, the estimator/identifier component 215 may use a trained classifier (e.g., an Adaptive Boosting classifier to assign one of a set of predefined classifications to a tracked object, e.g., to classify a foreground object as being a "person," a "vehicle," an "unknown," or an "other." In this context, the classification of "other" represents an affirmative assertion that the object is neither a "person" nor a "vehicle."

Alternatively, the estimator/identifier component 215 may derive a variety of micro features characterizing different aspects of a foreground object, e.g., size, height, width, and area (in pixels), reflectivity, shininess rigidity, speed velocity, etc. In the latter case, the machine-learning engine 140 may be configured to classify different foreground objects as being instances of a common object type, based on the similarity of one objects' micro features to others. This approach allows distinct object types to emerge from the clustering of micro features (e.g., using an ART network to cluster the micro features). For example, the micro features of multiple vehicles may all be clustered as being instances of a common agent type. In such a case, the estimator/identifier component 215 does not classify an observed vehicle as being a "vehicle" directly, but instead, as being an instance of an arbitrary object type having micro features similar to other vehicles observed by the computer vision engine 135.

The context processor component 220 may receive the output from other stages of the pipeline (i.e., the tracked objects, the background and foreground models, and the results of the estimator/identifier component 215). In one embodiment, the context processor 220 may generate a stream of context events regarding objects tracked (by tracker component 210) and evaluated (by estimator identifier component 215). For example, the context processor component 220 may package a stream of micro feature vectors and kinematic observations of an object and output this to the machine-learning engine 140, e.g., a rate of 5 Hz.

In one embodiment, the context events are packaged as being part of a trajectory associated with a given foreground object. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of becoming part of the scene background). Accordingly, assuming computer vision engine 135 is operating at a rate of 5 Hz, a trajectory for an object is updated every 200 milliseconds, until complete.

The computer vision engine 135 may take the outputs of the components 205, 210, 215, and 220 describing the motions and actions of the tracked objects in the scene and supply this information to the machine learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates kinematic data regarding the car's position and velocity. In such a case, this information is supplied to the machine learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "object begins to move in scene," "object moves to a given location," "object stops moving," and "object appears proximate to another object." The objects may represent persons and vehicles. As described in greater detail below, the primitive event stream may be used to excite the perceptual associative memory 230.

Illustratively, the machine learning engine 140 includes a long-term memory 225, a perceptual memory 230, an episodic memory 235, a workspace 240, codelets 245, a mapper component 211, mapper event data 255, a semantic labeler 260, and an analyzer 265. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream) and a primitive event stream generated by primitive event detector 212. The episodic memory 235 stores data representing observed events with details related to a particular event. That is, the episodic memory 235 may encode specific details of a particular event, i.e., "what, when, and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle appears and parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

Generally, the workspace 240 provides a computational engine for the machine learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine learning engine 140 performs a cognitive cycle used to observe, and learn, about patterns of behavior that occur within the scene.

In one embodiment, the mapper component 211 receives the context event stream and the primitive event stream and parse information to multiple ART networks to generate statistical models of what occurs in the scene for different groups of context events and primitive events. The statistical models of what occurs in the scene for different groups of context events and primitive events may be referred to as what is "learned" by the mapper component 211 and may be stored as the mapper event data 255.

In one embodiment, the semantic labeler 260 generates primitive trajectories and symbol trajectories from cluster labels received from the mapper component 211. Each primitive trajectory represents a "path" traversed by an object in moving through the scene. Further, each primitive trajectory represents a distinct set of kinematic data of the object (e.g., position and size of the object, position and velocity of the object, etc.). Each symbol trajectory is generated from primitive trajectories of the object. Each symbol trajectory represents a higher-order observation that may be learned (and recognized) by the machine learning engine 140. Specifically, the semantic labeler 260 may train the analyzer 265 using symbol trajectories observed in a scene. Once trained, the analyzer 265 may determine whether a new symbol trajectory is anomalous (relative to prior observation). If the new symbol trajectory is determined to be anomalous, the behavioral recognition system may alert a user.

Figure 3:
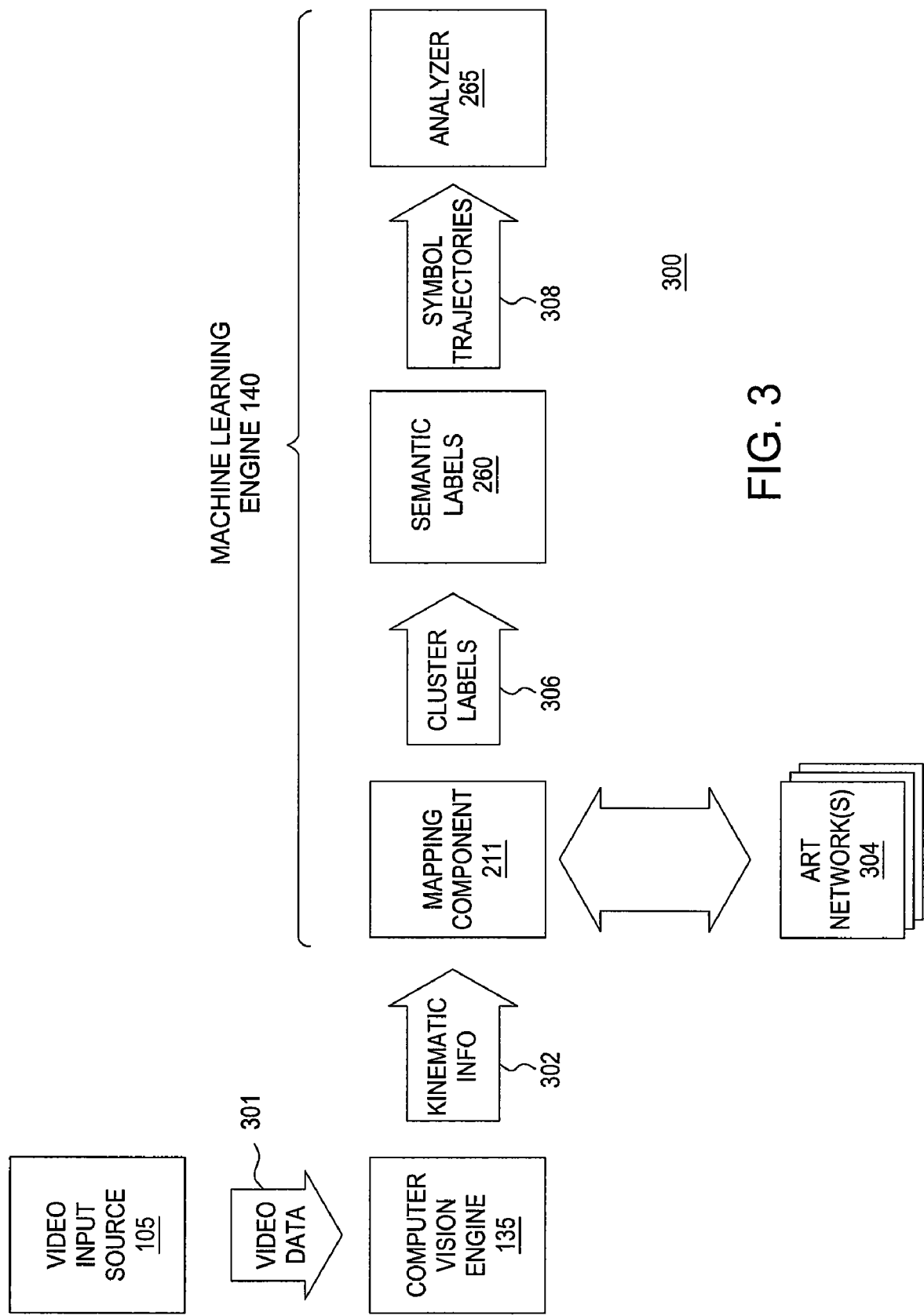
FIG. 3 illustrates a data flow of the behavior-recognition system, according to one embodiment of the invention.

FIG. 3 illustrates a data flow 300 of the computer system 115 of FIG. 1, according to one embodiment of the invention. As shown, the data flow includes the video input source 105, the computer vision engine 135, and the machine learning engine 140. In one embodiment, the video input source 105 may record and send video data 301 to the computer vision engine 135. The computer vision engine 135 may process the video data 301 to produce object classifications and a context event stream (i.e., kinematic data and/or micro feature data). In one embodiment, the computer vision engine 135 may send the video data 301, the object classifications, and the context event stream to the machine learning engine 140. Further, the machine learning engine may evaluate the context events to generate primitive events describing object behavior.

As shown, the machine learning engine 140 includes the mapper component 211, the semantic labeler 260, and the analyzer 265. As described above, the mapper component may parse data (e.g., from the context event stream, the primitive event stream, the phase-space symbol stream, etc.) and supply portions of the data as input to multiple ART networks 304. In response, the ART networks 304 each cluster the inputs data specified for a given ART network 304. Each cluster represents an observed statistical distribution of a particular thing or event being observed by that ART network. Further, each ART network 304 may model a distinct set of kinematic data 302 (e.g., from the context event stream) of objects being observed in a scene. For example, a first ART network may model positions and sizes of the objects; a second ART network may model positions and velocities of the objects; a third ART network may model positions and accelerations of the objects; and so forth.

In one embodiment, as each ART network 304 maps kinematic data 302 to a cluster, the mapper component 211 may send labels for the cluster to the semantic labeler 260. That is, when an input supplied to one of the ART networks is mapped to a cluster (or a new cluster is crated), the mapper component 211 may send a label for that cluster to the semantic labeler. In turn, the semantic labeler 260 may generate a primitive trajectory from the cluster labels for each ART network 304. For example, the semantic labeler 260 may generate a first primitive trajectory representing observed positions and sizes of an object in the scene (from cluster labels of the first ART network). The semantic labeler 260 may generate a second primitive trajectory representing observed positions and velocities of the object. The semantic labeler 260 may generate a third primitive trajectory representing observed positions and accelerations of the object, and so forth. Further, the semantic labeler 260 may generate a symbol trajectory 308 from multiple primitive trajectories. For example, the semantic labeler 260 may perform latent semantic analysis on the primitive trajectories. As is known, latent semantic analysis (LSA) is a technique in natural language processing for analyzing relationships between a set of documents and the terms contained in the documents by inferring a set of concepts related to the documents and the terms. In context of the present invention, the LSA approach may analyze a set f symbol trajectories and the sequences of labels in each trajectory.

In one embodiment, the semantic labeler 260 may perform latent semantic analysis on cluster labels and primitive trajectories of a scene. For example, the semantic labeler 260 may generate a matrix of occurrences of cluster labels in the primitive trajectories. In such a case, the rows off the matrix may represent the cluster labels, while columns of the matrix may represent primitive trajectories. In performing latent semantic analysis, the semantic labeler 260 may also perform a singular value decomposition of the matrix. As is known, singular value decomposition (SVD) is a technique for decomposing matrices. Specifically, SVD decomposes a rectangular matrix into a product of three component matrices. The three component matrices include: (i) a component matrix describing the rows of the (original) matrix as vectors of derived orthogonal factor values; (ii) a component matrix describing the columns of the original matrix as vectors of derived orthogonal factor values; and (iii) a diagonal matrix containing scaling values such that multiplying the three component matrices reconstructs the original matrix.

In one embodiment, the semantic labeler 260 may train the analyzer 265 using symbol trajectories 308. That is, a group of symbol trajectories may be supplied to the analyzer 265, which evaluates the trajectories to develop model for determining the probability of observing any particular symbol trajectory, relative to the training set. Once trained, the analyzer 265 may determine whether a new symbol trajectory 308 is anomalous (relative to prior observation). If the new symbol trajectory 308 is determined to be anomalous, the behavioral recognition system may alert a user.

Figure 4:
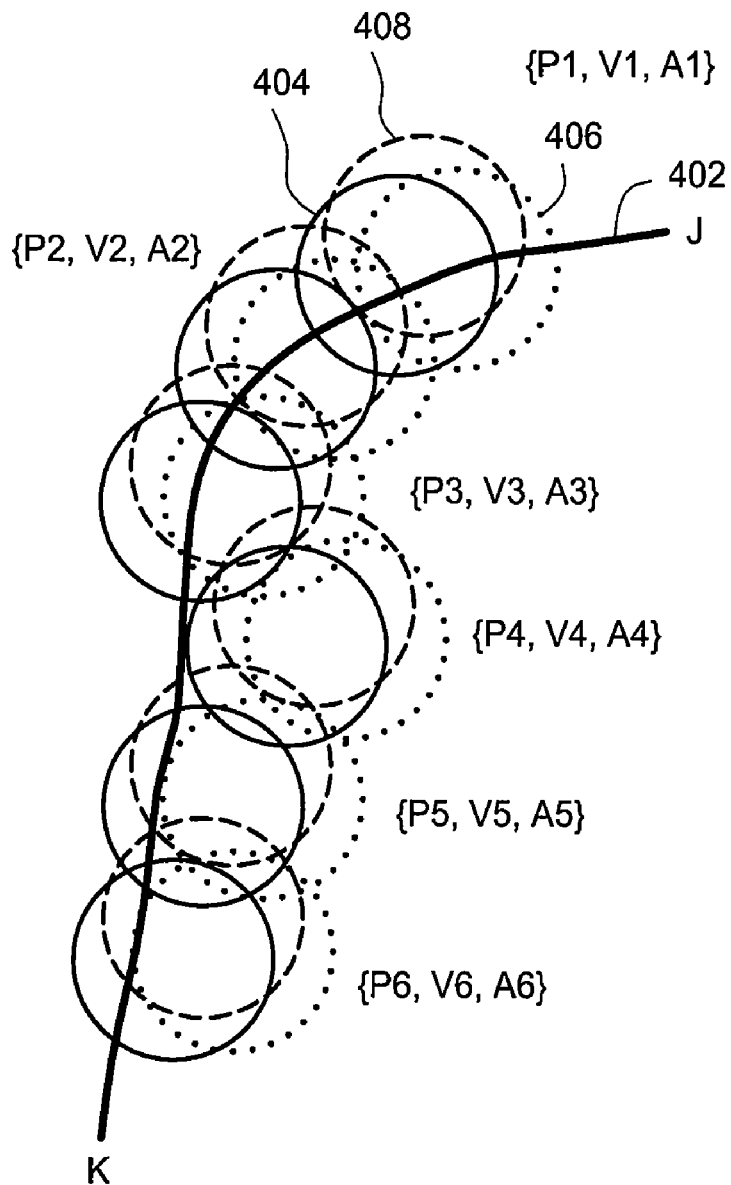
FIG. 4 illustrates examples of primitive trajectories derived for an object moving through a scene, according to one embodiment.

FIG. 4 illustrates examples of primitive trajectories 400 derived for an object moving through a scene, according to one embodiment. As shown, the behavior-recognition system observes that the object traverses a path 402 (i.e., from point J to point K). The path 402 is derived from the kinematic data (e.g., the (x, y) position of the object in the scene, as well as position and velocity. Assuming the computer vision engine 135 outputs context events at a rate of 5 Hz, then a set of kinematic data is available every 200 milli-seconds to be mapped into the ART networks of the mapper component 211. FIG. 4 illustrates this result where the path 402 is shown superimposed over clusters from three ART networks of the mapper 211. Specifically, one ART network for modeling object position, height, and width; one for modeling position and velocity; and one for modeling position and acceleration. As described above, the semantic labeler 260 may derive primitive trajectories 400 for the object from the labels assigned to each cluster to which a given set of input data is mapped to.

Suppose that a first primitive trajectory 404 (representing position and size of the object) includes the cluster labels P1 through P6. Further, suppose that the second primitive trajectory 406 (representing position and velocity of the object) includes the cluster labels V1 through V6. Further still, suppose that the third primitive trajectory 408 (representing position and acceleration of the object) includes the cluster labels A1 through A6. As stated, the each ART network may cluster kinematic data for the object. For example, at time t=0 seconds, the ART networks map distinct sets of kinematic data to the clusters P1, V1, and A1, respectively. At time t=0.2 seconds, the ART networks map distinct sets of kinematic data to the clusters P2, V2, and A2, and so forth.

In one embodiment, the semantic labeler 260 may also generate a symbol trajectory from primitive trajectories. The symbol trajectory may include symbols, corresponding to one or more cluster labels. For example, the symbol trajectory may include a first symbol defined as a set {P1, V1, A1}. The symbol trajectory may include a second symbol {P2, V2, A2}, and so forth. Elements of each set may be ordered by ART network. For example, the first element of each set is a cluster label of the ART network for position and size. The second element of each set is a cluster label of the ART network for position and velocity, and so forth. Each symbol trajectory represents a higher-order observation that may be learned (and recognized) by the machine learning engine 140.

Figure 5:
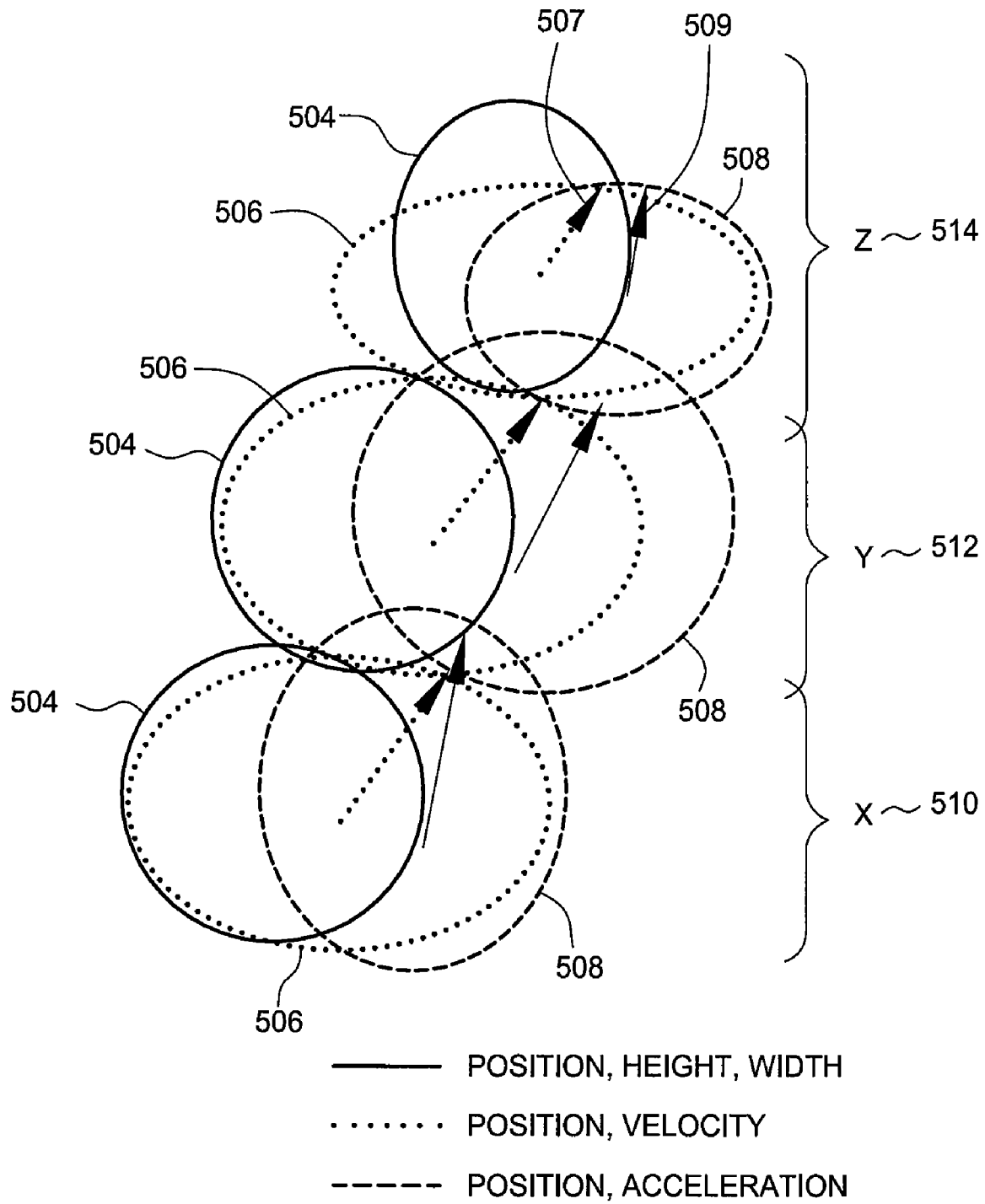
FIG. 5 illustrates an example of a symbol trajectory derived for an object moving through a scene, according to one embodiment.

FIG. 5 illustrates an example of a symbol trajectory 500 derived for an object moving through a scene, according to one embodiment. As shown, the symbol trajectory 500 includes symbols "X" 510, "Y" 512, and "Z" 514. In one embodiment, the semantic labeler 260 may define the symbol trajectory 500 as a bag of symbols (e.g., {X, Y, Z}). As is known, a bag (or multiset) is a generalization of a set. Specifically, unlike a set, a bag may include multiple instances of a member of the bag.

As shown, the symbol trajectory 500 is defined over three primitive trajectories 504, 506, 508. Trajectories 504, 506, 508, respectively, represent the cluster mappings for the kinematic data of position and size, position and velocity, and position and acceleration of an object. Further, the trajectory 506 includes an arrow 507 depicting magnitude and direction of the velocity of the object (or more specifically, of the specific cluster that the object maps to). Similarly, the trajectory 508 includes an arrow 509 depicting magnitude and direction of the acceleration of the object. As shown, the symbol X 510 includes the one cluster label from each of the three primitive trajectories 504, 506, 508. The symbol Y 512 includes another cluster label from each of the three primitive trajectories 504, 506, 508. The symbol Z 514 includes a further cluster label from each of the three primitive trajectories 504, 506, 508. Consequently, the semantic labeler 260 may express the primitive trajectories 504, 506, 508 as a higher-order concept, i.e., as a symbol trajectory {X, Y, Z}.

In one embodiment, the analyzer 265 may be trained using a batch of symbol trajectories received from the semantic labeler 260. While the size of the set for training the analyzer 265 may be tailored to suit the needs of a particular case, a set of 50-100 symbol trajectories has proven useful in some cases where the symbol trajectories average 15 symbols in length.

Once trained, the analyzer 265 may determine whether a new symbol trajectory is anomalous. For example, in one embodiment, the analyzer 265 may compute a probability of observing the symbol trajectory (based on the previously observed symbol trajectories in the training set). For example, the analyzer 265 may generate a Markov process from the previously observed symbol trajectories. As is known, a Markov process is a model for the random evolution of a memoryless system, i.e., one for which the likelihood of a given future state, at any given moment, depends only on the present state, and not on any past states. For instance, the analyzer 265 may construct a matrix. The matrix may include rows representing a current state and columns representing a next state. Each state of the Markov process corresponds to a symbol (e.g., X, Y, Z) of the symbol trajectory. For example, suppose the cell at row X and column Y of the matrix has a value of 0.75. In other words, the probability of observing a next symbol of Y in the symbol trajectory is 0.75 if the symbol X has just been observed. The analyzer 265 may populate the matrix using previously observed symbol trajectories.

Once the matrix is populated, the analyzer 265 may use the matrix to compute a probability of observing a specific symbol trajectory. For example, suppose the cell at row Y and column Z of the matrix has the value of 0.2. In this specific example, the probability of observing the symbol trajectory of XYZ upon observing X is given by (0.75*0.2)=0.15. Of course, those skilled in the art will recognize that the probability of observing a symbol trajectory may be computed using other techniques without departing from the scope of the invention (e.g., using a hidden Markov model, probabilistic latent semantic analysis, etc.). For example, the analyzer may use a Baum-Welch algorithm or a forward-backward algorithm. The Baum-Welch algorithm to find unknown parameters of the hidden Markov model, and the forward-backward algorithm computes a probability of a particular observation sequence.

Figure 6C:
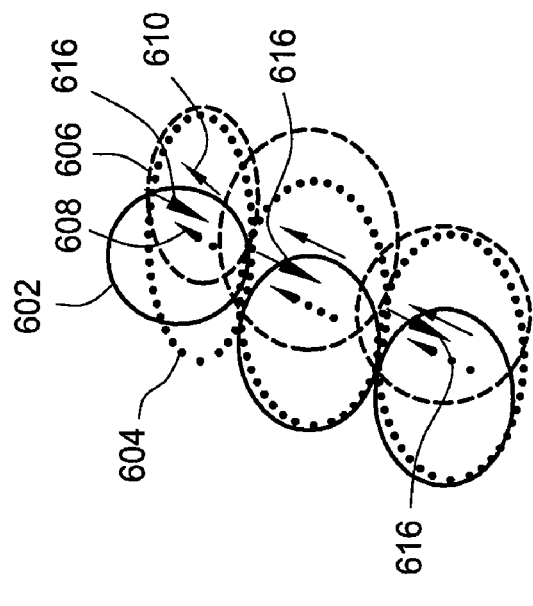
FIGS. 6A-6C illustrate examples of determining whether a symbol trajectory is anomalous, according to one embodiment.
Figure 6B:
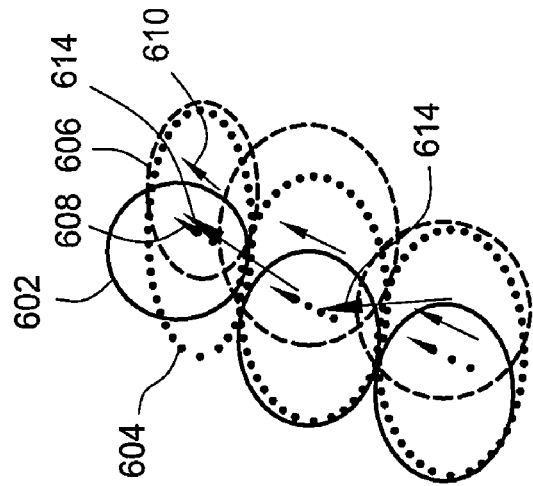
Figure 6A:
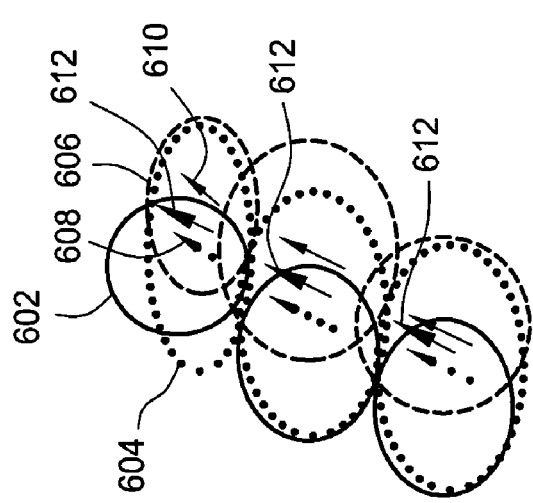

FIGS. 6A-6C illustrate examples of determining whether a new symbol trajectory is anomalous, according to one embodiment. FIGS. 6A-6C each include three primitive trajectories 602, 604, 606 respectively representing position and size, position and velocity, and position and acceleration of an object in the scene. Further, the primitive trajectories 602, 604, 606 each include: (i) arrows 608 representing magnitude and direction of the velocity and (ii) arrows 610 representing magnitude and direction of the acceleration. FIG. 6A illustrates an example of a new symbol trajectory that the analyzer 265 may declare as being normal (i.e., not anomalous). The new symbol trajectory is represented using arrows 612. The arrows 612 represent a composite of the position, size, velocity, and acceleration of the object. In this particular example, the (direction and length of the) arrows 612 are aligned with the clusters and arrows 608, 610 of previously observed primitive trajectories 602, 604, 606. Accordingly, the analyzer 265 may declare the new symbol trajectory as being normal.

FIG. 6B illustrates an example of a new symbol trajectory that the analyzer 265 may declare as being anomalous, according to one embodiment. In this specific example, the new symbol trajectory is represented using arrows 614. As shown, the arrows 614 are only partially aligned with the clusters and arrows 608, 610 of previously observed primitive trajectories 602, 604, 606. Accordingly, the analyzer 265 may declare the new symbol trajectory as being anomalous.

FIG. 6C illustrates another example of a new symbol trajectory that the analyzer 265 may declare as being anomalous, according to one embodiment. In this specific example, the new symbol trajectory is represented using arrows 616. As shown, the direction of the arrows 616 are opposite of the arrows 608, 610 of previously observed primitive trajectories 602, 604, 606. Accordingly, the analyzer 265 may declare the new symbol trajectory as being anomalous.

Figure 7:
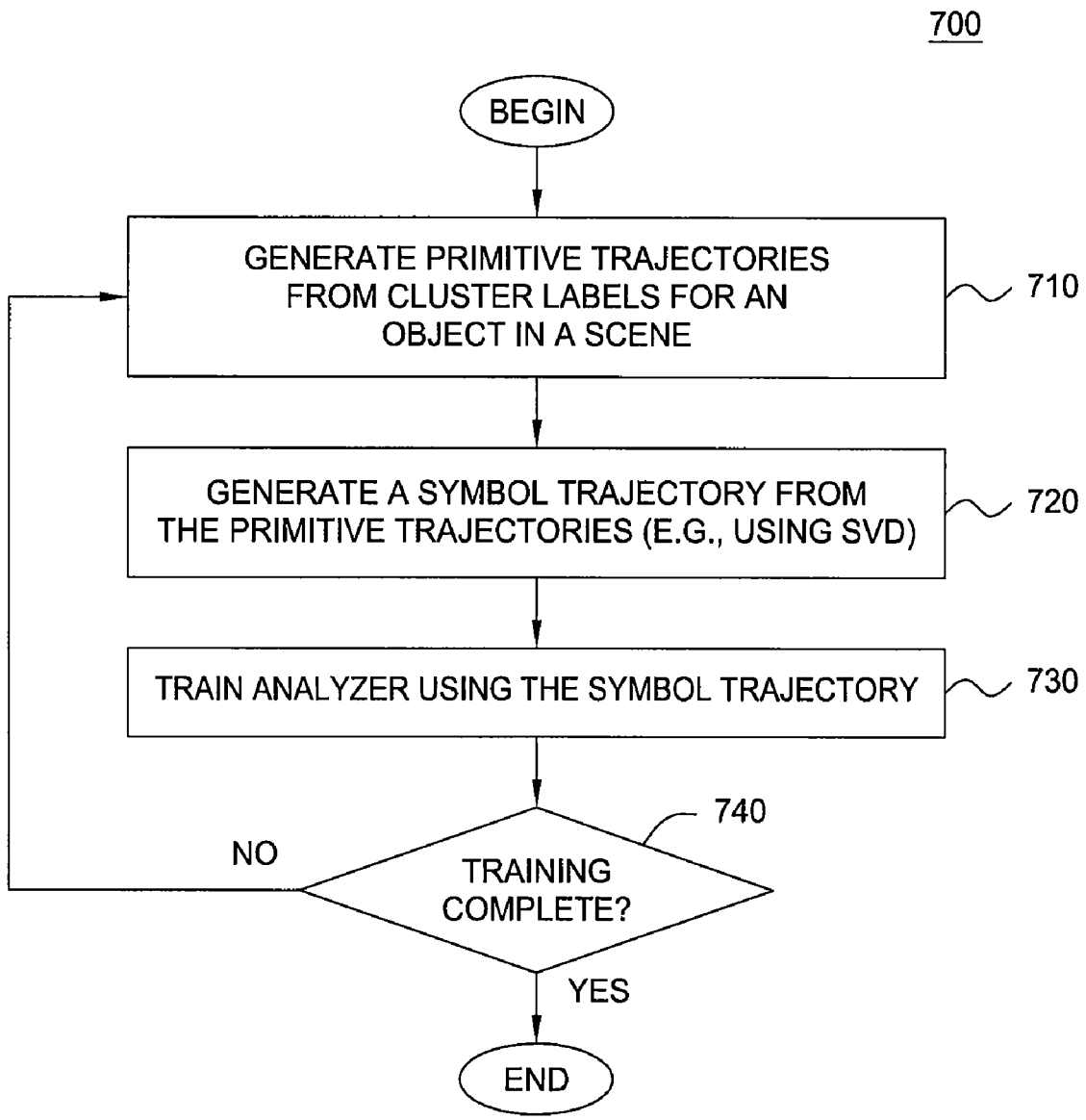
FIG. 7 illustrates a method for training a behavior-recognition system to identify anomalous trajectories, according to one embodiment of the invention.

FIG. 7 illustrates a method 700 for training the behavior-recognition system to identify anomalous trajectories, according to one embodiment of the invention. As shown, the method 700 begins at step 710, where the semantic labeler 260 generates primitive trajectories from cluster labels for an object moving through a scene. That is, semantic labeler 260 generates a symbolic representation (e.g., the sequence of cluster labels assigned to clusters in an ART network). At step 720, the semantic labeler 260 generates a symbol trajectory from the primitive trajectories, e.g., using SVD (singular value decomposition) or LSA (Latent Semantic analysis). At step 730, the semantic labeler 260 trains the analyzer 265 using the symbol trajectory. For example, the semantic labeler 260 may update a probabilistic model (e.g., a Markov process) using the symbol trajectory. At step 740, the semantic labeler 260 determines whether training is complete, i.e., whether enough trajectories have been used to train the analyzer 265 to allow it to be used to determine a probability of observing any particular trajectory. In one embodiment, users may specify a threshold number of trajectories that should be used to train the analyzer 265. If not, the method 700 returns to the step 710 to process a next trajectory. Otherwise, the method 700 terminates.

Figure 8:
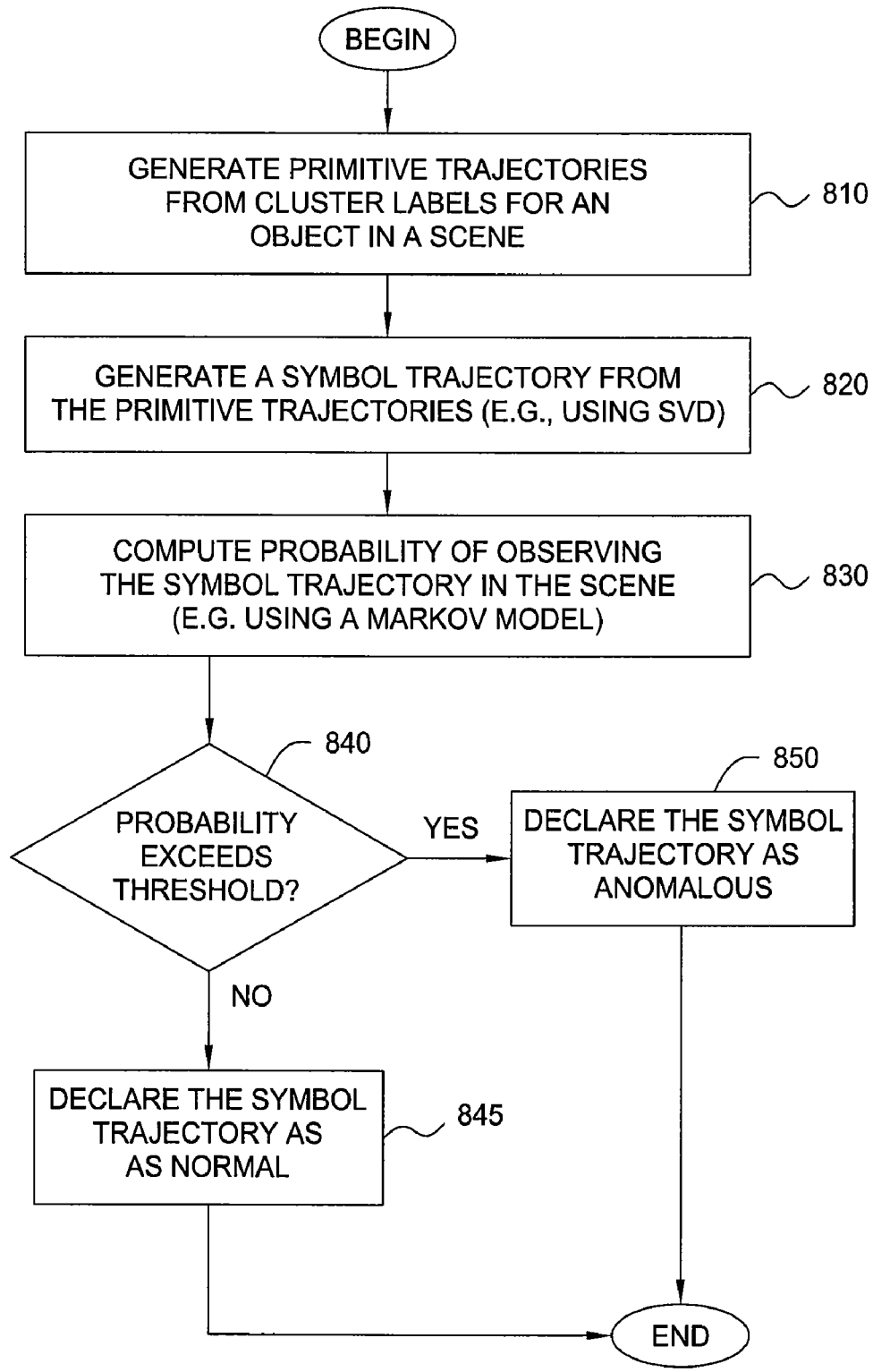
FIG. 8 illustrates a method for identifying an anomalous trajectory, according to one embodiment of the invention.

FIG. 8 illustrates a method 800 for identifying an anomalous trajectory, according to one embodiment of the invention. As shown, the method 800 begins at step 810, where the semantic labeler 260 generates primitive trajectories from cluster labels for an object in the scene. At step 820, the semantic labeler 260 generates a symbol trajectory from the primitive trajectories. At step 830, the analyzer 265 determines a probability of observing the symbol trajectory in the scene (e.g., using the probabilistic model generated as described above). The analyzer 265 may also update the probabilistic model. That is, the analyzer may train on-line using each additional trajectory, refining the probabilistic model with each observed input. At step 840, the analyzer 265 determines whether the probability of observing the symbol trajectory generated at step 830 is below a threshold value. Of course, those skilled in the art will recognize that the threshold value may be tailored to suit the needs of a particular case. For example, the threshold value may be expressed as a probability value, as a percentile, etc. If the probability falls below the threshold value, the analyzer may declare the symbol trajectory as anomalous (step 850). Otherwise, the analyzer may declare the symbol trajectory as normal (step 845). After the steps 845 or 850, the method 800 terminates.

Advantageously, embodiments of the invention provide techniques for determining anomalous trajectories of objects tracked over a sequence of video frames. One embodiment provides a machine learning engine that includes both a semantic labeler and an analyzer. The semantic labeler may derive a symbol trajectory from observing an object moving through a scene. The symbol trajectory represents semantic concepts extracted from the trajectory of the object in the scene. The semantic labeler may train the analyzer with a number of symbol trajectories derived from observing objects in the scene. Once trained, the analyzer may determine whether a new symbol trajectory is anomalous (relative to prior observation). Further, anomalous behavior of a foreground object may result in an alert passed to users of the behavioral recognition system. Consequently, the machine learning engine performs unsupervised learning to automatically determine what trajectories are anomalous (or not). This unsupervised learning and trajectory discovery are adaptive because the knowledge about existing trajectories is dynamically updated as new trajectories appear and are classified by the machine learning engine. That is, the machine learning engine is not limited to specific pre-defined trajectory types.

While the foregoing is directed to embodiments of the present invention, other and further embodiments of the invention may be devised without departing from the basic scope thereof, and the scope thereof is determined by the claims that follow.

What is claimed is:

1. A computer-implemented method for analyzing a sequence of video frames depicting a scene captured by a video camera, the method comprising:
    passing each of a plurality of kinematic data vectors derived from analyzing a foreground object detected in the sequence of video frames to a plurality of adaptive resonance theory (ART) networks, each ART network modeling a subset of kinematic data parsed from the kinematic data vectors;
    identifying, in each ART network, a cluster to which each respective subset of kinematic data parsed from the plurality of kinematic data vectors is mapped;
    generating a primitive trajectory based on the clusters identified in each of the ART networks; and
    generating a symbol trajectory from the primitive trajectory.

2. The computer-implemented method of claim 1, wherein the primitive trajectory includes a sequence of labels assigned to the clusters in a respective ART network, wherein the sequence corresponds to an order in which the plurality of kinematic data vectors are passed to the respective ART network.

3. The computer-implemented method of claim 1, wherein the symbol trajectory is generated using latent semantic analysis (LSA) and singular value decomposition (SVD) applied to the primitive trajectory.

4. The computer-implemented method of claim 1, further comprising:
    computing a probability of observing the symbol trajectory in the scene.

5. The computer-implemented method of claim 4, wherein the probability of observing the symbol trajectory in the scene is computed based on a plurality of symbol trajectories previously observed in the scene.

6. The computer-implemented method of claim 4, wherein the probability of observing the symbol trajectory in the scene is computed using at least one of a Markov model, a hidden Markov model, and probabilistic latent semantic analysis.

7. The computer-implemented method of claim 4, further comprising:
    upon determining that a probability of observing the symbol trajectory falls below a threshold value, alerting a user upon of the video surveillance system of an occurrence of an anomalous trajectory.

8. A computer-readable storage medium containing a program which, when executed by a processor, performs an operation for analyzing a sequence of video frames depicting a scene captured by a video camera, the operation comprising:
    passing each of a plurality of kinematic data vectors derived from analyzing a foreground object detected in the sequence of video frames to a plurality of adaptive resonance theory (ART) networks, each ART network modeling a subset of kinematic data parsed from the kinematic data vectors;
    identifying, in each ART network, a cluster to which each respective subset of kinematic data parsed from the plurality of kinematic data vectors is mapped;
    generating a primitive trajectory based on the clusters identified in each of the ART networks; and
    generating a symbol trajectory from the primitive trajectory.

9. The computer-readable storage medium of claim 8, wherein the primitive trajectory includes a sequence of labels assigned to the clusters in a respective ART network, wherein the sequence corresponds to an order in which the plurality of kinematic data vectors are passed to the respective ART network.

10. The computer-readable storage medium of claim 8, wherein the symbol trajectory is generated using latent semantic analysis (LSA) and singular value decomposition (SVD) applied to the primitive trajectory.

11. The computer-readable storage medium of claim 8, wherein the operation further comprises:
    computing a probability of observing the symbol trajectory in the scene.

12. The computer-readable storage medium of claim 11, wherein the probability of observing the symbol trajectory in the scene is computed based on a plurality of symbol trajectories previously observed in the scene.

13. The computer-readable storage medium of claim 11, wherein the probability of observing the symbol trajectory in the scene is computed using at least one of a Markov model, a hidden Markov model, and probabilistic latent semantic analysis.

14. The computer-readable storage medium of claim 11, wherein the operation further comprises:
upon determining that a probability of observing the symbol trajectory falls below a threshold value, alerting a user upon of the video surveillance system of an occurrence of an anomalous trajectory.

15. A system, comprising:
a video input source configured to provide a sequence of video frames, each depicting a scene;
a processor; and
a memory containing a program, which, when executed on the processor is configured to perform an operation for analyzing the scene, as depicted by the sequence of video frames captured by the video input source, the operation comprising:
passing each of a plurality of kinematic data vectors derived from analyzing a foreground object detected in a sequence of video frames to a plurality of adaptive resonance theory (ART) networks, each ART network modeling a subset of kinematic data parsed from the kinematic data vectors,
identifying, in each ART network, a cluster to which each respective subset of kinematic data parsed from the plurality of kinematic data vectors is mapped,
generating a primitive trajectory based on the clusters identified in each of the ART networks, and
generating a symbol trajectory from the primitive trajectory.

16. The system of claim 15, wherein the primitive trajectory includes a sequence of labels assigned to the clusters in a respective ART network, wherein the sequence corresponds to an order in which the plurality of kinematic data vectors are passed to the respective ART network.

17. The system of claim 15, wherein the symbol trajectory is generated using latent semantic analysis (LSA) and singular value decomposition (SVD) applied to the primitive trajectory.

18. The system of claim 15, further comprising:
computing a probability of observing the symbol trajectory in the scene.

19. The system of claim 18, wherein the probability of observing the symbol trajectory in the scene is computed based on a plurality of symbol trajectories previously observed in the scene.

20. The system of claim 18, wherein the probability of observing the symbol trajectory in the scene is computed using at least one of a Markov model, a hidden Markov model, and probabilistic latent semantic analysis.

21. The system of claim 18, further comprising:
upon determining that a probability of observing the symbol trajectory falls below a threshold value, alerting a user upon of the video surveillance system of an occurrence of an anomalous trajectory.

\* \* \* \* \*